United States Patent

Chopin et al.

[11] Patent Number: 5,149,519
[45] Date of Patent: Sep. 22, 1992

[54] PREPARATION OF SULFUR-FREE TITANIUM DIOXIDE

[75] Inventors: Thierry Chopin, Saint Denis; Patrick Fourré, Paris, both of France

[73] Assignee: Rhone-Poulenc Chimie, Courbevoie, France

[21] Appl. No.: 649,180

[22] Filed: Feb. 4, 1991

Related U.S. Application Data

[63] Continuation of Ser. No. 330,482, Mar. 30, 1989, abandoned.

[30] Foreign Application Priority Data

Mar. 30, 1988 [FR] France ................. 88 04169

[51] Int. Cl.$^5$ ............................................. C01G 23/04
[52] U.S. Cl. .................................... 423/610; 423/611; 423/612; 423/598
[58] Field of Search ............... 423/610, 611, 612, 598; 106/436; 501/136, 137

[56] References Cited

U.S. PATENT DOCUMENTS

| Re. 21,693 | 1/1941 | Plechner et al. | 423/612 |
|---|---|---|---|
| 1,914,557 | 6/1933 | Craver | 502/170 |
| 2,113,946 | 4/1938 | Plechner | 423/612 |
| 2,290,922 | 7/1942 | Verduin | 423/610 |
| 2,519,389 | 8/1950 | Mayer | 423/610 |
| 4,388,288 | 6/1983 | Dupin et al. | 423/416 |
| 4,748,016 | 5/1988 | Browaeys et al. | 423/598 |
| 4,923,682 | 5/1990 | Roberts et al. | 423/610 |

FOREIGN PATENT DOCUMENTS

| 0141696 | 5/1985 | European Pat. Off. . |  |
|---|---|---|---|
| 813757 | 6/1937 | France . |  |
| 828741 | 5/1938 | France . |  |
| 53-39296 | 4/1978 | Japan . |  |
| 58-117259 | 7/1983 | Japan . |  |
| 481633 | 11/1975 | U.S.S.R. . |  |
| 0662502 | 5/1979 | U.S.S.R. | 423/610 |
| 715476 | 2/1980 | U.S.S.R. . |  |
| 308725 | 6/1930 | United Kingdom . |  |
| 481892 | 3/1938 | United Kingdom . |  |
| 497694 | 12/1938 | United Kingdom . |  |

*Primary Examiner*—Michael Lewis
*Assistant Examiner*—Steven Bos
*Attorney, Agent, or Firm*—Burns, Doane, Swecker & Mathis

[57] ABSTRACT

Sulfur-free anatase titanium dioxide, readily dispersible in aqueous media and well adopted for the production of electronic-grade alkaline earth metal titanates, e.g., barium and strontium titanates, is prepared by hydrolyzing a sulfur-free compound of titanium in the presence of (i) at least one acid containing either one carboxyl group and at least two hydroxyl and/or amino groups, or at least two carboxyl groups and at least one hydroxyl and/or amino group, or (ii) at least one salt of the at least one acid (i).

20 Claims, No Drawings

PREPARATION OF SULFUR-FREE TITANIUM DIOXIDE

This application is a continuation of application Ser. No. 07/330,482, filed Mar. 30, 1989, now abandoned.

BACKGROUND OF THE INVENTION

1. Field of the Invention

The present invention relates to the preparation of titanium dioxide, $TiO_2$, and, more especially, to the preparation of anatase titanium dioxide devoid of sulfur contaminants and readily dispersible in aqueous solutions.

This invention also relates to the use of such titanium dioxide in the synthesis of alkaline earth metal titanates suitable for electronic applications.

2. Description of the Prior Art

It is known to this art that the alkaline earth metal titanates (principally barium and strontium titanates) which are suitable for electronic applications (production of capacitors, resistors, etc.) must be of high purity, in particular vis-a-vis the sulfur content thereof ($<500$ ppm).

FR 2,551,743 describes a process for the preparation of alkaline earth metal titanates wherein a titanium dioxide sol is mixed with a solution of a nitrate of the alkaline earth metal, and the resulting mixture is dried and ultimately calcined.

However, the initial sol used in the aforesaid process is obtained by the thermohydrolysis of a titanium oxysulfate, $TiOSO_4$, such that even after successive and lengthy washings of the sol, not insubstantial amounts of sulfur remain associated with the titanium dioxide and, consequently, such contaminant is transferred into the final titanate powders.

It is also known to the art that it is possible to prepare titanium dioxide devoid of sulfur values by the thermohydrolysis of a solution of titanium oxychloride, but the resulting oxide is essentially completely in rutile form, such that it cannot be used for the preparation of stable sols of $TiO_2$.

SUMMARY OF THE INVENTION

Accordingly, a major object of the present invention is the provision of a simple, efficient and readily carried out improved process for the preparation of anatase titanium dioxide devoid of sulfur contaminants and well adopted for the production of stable titanium dioxide sols, which improved process is both reliable and reproducible and otherwise obviates, or at least ameliorates, those disadvantages and drawbacks to date characterizing the state of this art.

Briefly, the present invention features a process for the preparation of anatase titanium dioxide, comprising hydrolyzing a titanium compound (compound A), and recovering a final product titanium dioxide, and wherein such process the titanium compound starting material is free of sulfur values, and said hydrolysis is carried out in the presence of at least one compound (compound B) selected from among:

(i) an organic carboxylic acid containing either one carboxyl group and at least a total of two hydroxyl and/or amine groups, or containing at least two carboxyl groups and at least one hydroxyl and/or amine groups; and (ii) salts of the aforesaid acids (i).

DETAILED DESCRIPTION OF THE PREFERRED EMBODIMENTS OF THE INVENTION

More particularly according to the present invention, titanium dioxides are thus produced which, in addition to the fact that they are devoid of contaminating sulfur values, are easily dispersed in aqueous solutions to directly yield completely stable sols thereof The first stage of the process of the invention thus comprises the preparation of a reaction medium comprising a solution containing at least one compound A and at least one compound B, as defined above.

This initial solution to be hydrolyzed is preferably entirely aqueous; optionally, another solvent may be added, an alcohol for example, provided that the A and B compounds are substantially soluble in the mixture.

On the other hand, the titanium compound A must be free of sulfur thus excluding salts of the titanium sulfate or oxysulfate type.

Nonetheless, precursors of $TiO_2$ of such types as titanium halides, oxyhalides, nitrates or alkoxides, are particularly suitable for use in the process of the invention.

Preferably, titanium halides or oxyhalides are used as the titanium compounds A. Exemplary such titanium halides or oxyhalides are the fluorides, chlorides, bromides and iodides, and, respectively, the oxyfluorides, oxychlorides, oxybromides and oxyiodides.

In a particularly preferred embodiment of the invention, titanium oxyhalides and, even more preferably, titanium oxychloride, $TiOCl_2$, are hydrolyzed.

Exemplary of the compounds B employed in the process of the present invention, the following are representative:

(1) hydroxypolycarboxylic acids, and more particularly hydroxydi- or hydroxytricarboxylic acids, such as, for example, malic acid, citric acid and tartaric acid;

(2) (polyhydroxy)monocarboxylic acids, such as, for example, glucoheptonic acid and gluconic acid;

(3) poly(hydroxycarboxylic) acids, such as, for example, tartaric acid;

(4) dicarboxylic aminoacids and their corresponding amides, such as, for example, aspartic acid, asparagine and glutamic acid; and (5) monocarboxylic aminoacids, whether or not hydroxylated, such as, for example, lysine, serine and threonine.

As indicated above, it is also possible to use any of the salts of the aforementioned acids.

Preferably, these salts are the alkali metal or ammonium salts and, more preferably, the sodium or ammonium salts.

Preferably, the compounds B as defined above are of aliphatic hydrocarbon type.

Also preferably, the length of the principal hydrocarbon chain should not exceed 15 carbon atoms and, more preferably, should not exceed 10 carbon atoms.

The amount of the titanium compound present in the solution of hydrolysis is not critical. However, said amount is advantageously such that the molar concentration of titanium in the reaction medium ranges from approximately 0.1 mole/liter to 1.5 mole/liter.

Titanium concentrations of less than 0.1 mole/l detract from the economics of the process.

Titanium concentrations higher than 1.5 mole/l may interfere with the yield of the hydrolysis reaction.

For titanium concentrations around or greater than 1.5 mole/l, it may also be advantageous to add ammonia, NH₄OH, to the solution in a molar ratio of [NH₃]/[Ti] preferably not exceeding 1.5, in order to increase the yield and/or the kinetics of the hydrolysis reaction.

The concentration of the compound B in the reaction medium is also not critical; it may range from 0.002 mole/l to 0.5 mole/l. In general, it is found that relatively low compound B concentrations, i.e., concentrations ranging from 0.002 mole/l to 0.1 mole/l are satisfactory to provide the desired results.

The reaction medium obtained in this manner is then hydrolyzed.

The hydrolysis is preferably carried out at a temperature higher than or equal to 70° C. Lower temperatures may be used, but then the hydrolysis reaction is much longer, which also detracts from the economics of the process.

Upon completion of the reaction, the solids formed are recovered, in particular by filtration.

The solids recovered in this manner may then be washed, for example with water, to eliminate any residual impurities, and then dried.

X-ray diffraction analysis indicates that the product obtained in this manner is titanium dioxide, $TiO_2$, present essentially completely in the anatase crystalline form.

It has also been determined that such titanium dioxide may be suspended without any problems in an acidified aqueous solution as to form a perfectly stable sol.

Without wishing to be bound to any particular theory, it is believed likely that the anatase structure of the resulting titanium dioxide is a principal reason for its good dispersibility; on the other hand, it appears that the presence of the compound B as defined above contributes to the preferential orientation of the crystallization of the titanium dioxide in the anatase form.

The titanium dioxide powders produced via the process according to this invention are useful in numerous applications.

One of the most promising applications is for the production of materials useful in the electronics industry, whether in the form of powders or as solid shaped articles, based on high purity alkaline earth metal titanates.

More particularly, the titanium dioxide powders prepared by the process of the invention may be used for the synthesis of alkaline earth metal titanates by the method described in FR 2,551,743, hereby incorporated by reference.

From an overall point of view, therefore, a titanium dioxide sol is prepared from the titanium dioxide obtained by the process of the invention, such sol is mixed with a solution of an alkaline earth metal nitrate, the resulting suspension is dried, and the dried product is calcined and optionally ground. This permits ultimate production of a high purity alkaline earth metal titanate powder which is essentially completely devoid of contaminating sulfur values.

These powders may then be employed in conventional sintering processes to fabricate solid alkaline earth metal titanate shaped articles.

In order to further illustrate the present invention and the advantages thereof, the following specific examples are given, it being understood that same are intended only as illustrative and in nowise limitative.

EXAMPLE 1

To one liter of a titanium oxychloride solution containing one mole of titanium, 0.05 mole tartaric acid of the formula:

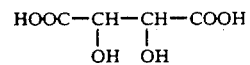

was added.

The solution was then heated to boiling and maintained at this temperature for 4 hours.

After cooling, the solution was filtered and the resulting solids were washed with one liter of distilled water, then dried in a vacuum.

X-ray diffraction analysis indicated that the product obtained was titanium dioxide entirely in the anatase The washed but undried solids were resuspended in water in a proportion of 10% by weight $TiO_2$. Nitric acid was added to adjust the pH to 1.0.

A perfectly stable sol was produced in this manner, the particle size in suspension of which, as measured by the quasi-elastic diffusion of light, was 80 nanometers, with the particles themselves being crystallites of a size on the order of 5 nanometers.

EXAMPLE 2

To one liter of the titanium oxychloride solution containing 0.5 mole of Ti, 0.1 mole of citric acid of the formula:

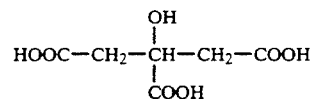

was added.

The solution obtained in this manner was subjected to the same treatment as in Example 1.

X-ray diffraction analysis indicated that the solid product obtained was titanium dioxide present entirely in the anatase form.

It was possible, as in Example 1, to produce a perfectly stable $TiO_2$ sol therefrom.

EXAMPLE 3

The procedure of Example 2 was repeated, under the same conditions, but by replacing the citric acid with aspartic acid of the formula:

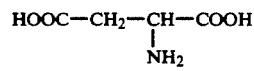

In this example also, the solid product obtained was a titanium dioxide in the anatase form.

EXAMPLE 4

The procedure of Example 2 was repeated, under the same conditions, but by replacing the citric acid with sodium glucoheptonate of the formula:

The resulting solids constituted titanium dioxide in the anatase form.

EXAMPLE 5

To one liter of a solution of titanium oxychloride containing one mole of Ti, 0.02 mole of citric acid was added. Anatase nuclei were also added to this solution in a proportion of 2% by weight relative to the total amount of $TiO_2$.

The mixture was heated to boiling and maintained at this temperature for 6 hours. The solution was then filtered and the solids obtained washed with 2 liters of distilled water.

A fraction of the solids was dried under vacuum.

X-ray diffraction analysis indicated that such solids content constituted titanium dioxide entirely in the anatase form.

The other fraction of the undried solids was examined by transmission electronic microscopy. Particles very homogeneous in size were observed; their mean particle size was 45 nanometers.

COMPARATIVE EXAMPLE 6

The procedure of Example 1 was repeated, while omitting the tartaric acid addition.

The washed and undried solids were resuspended, at a pH of 1.0; they settled spontaneously. X-ray diffraction analysis indicated that such solids content constituted titanium dioxide entirely in the rutile form.

COMPARATIVE EXAMPLE 7

The procedure of Example 2 was repeated, except that the citric acid was replaced by oxalic acid, a dicarboxylic acid (HOOC—COOH), and which was thus outside the scope of this invention.

The washed and undried solids were resuspended at a pH of 1.0; they settled spontaneously. X-ray diffraction analysis indicated that such solids content constituted titanium dioxide entirely in the rutile form.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of anatase titanium dioxide, comprising a step of hydrolyzing a sulfur-free compound of titanium in the presence of
   (i) at least one organic carboxylic acid containing a combination of groups of either:
      (A) one carboxyl group in combination with
         (a) at least one hydroxyl group and at least one amine group, or
         (b) at least two amine groups, or
         (c) at least two hydroxyl groups,
      or (B) at least two carboxyl groups in combination with
         a) at least one hydroxyl group and at least one amine group, or
         b) at least one hydroxyl group, or
         c) at least one amine group,
   or (ii) at least one salt of said at least one acid (i), said hydrolysis being carried out in a reaction medium with a molar concentration of titanium ranging from 0.1 to 1.5 mole/liter in the reaction medium and a concentration of said at least one acid (i) or salt (ii) ranging from 0.002 to 0.5 mole/liter in the reaction medium and a step of recovering a product consisting essentially of anatase, sulfur-free titanium dioxide directly from said hydrolyzing step.

2. The process as defined by claim 1, said concentration of said at least one acid (i) or salt (ii) ranging from 0.002 to 0.1 mole/liter.

3. The process as defined by claim 1, said sulfur-free compound of titanium comprising a titanium halide, oxyhalide, nitrate or alkoxide.

4. The process as defined by claim 3 said sulfur-free compound of titanium comprising a titanium halide or oxyhalide.

5. The process as defined by claim 4, said sulfur-free compound of titanium comprising a titanium oxyhalide.

6. The process as defined by claim 5, said titanium oxyhalide comprising titanium oxychloride.

7. The process as defined by claim 1, said at least one acid (i) or salt (ii) comprising an aliphatic hydrocarbyl moiety.

8. The process as defined by claim 7, said aliphatic hydrocarbyl moiety containing not more than 15 carbon atoms.

9. The process as defined by claim 8, said aliphatic hydrocarbyl moiety containing not more than 10 carbon atoms.

10. The process as defined by claim 1, said hydrolysis being carried out in the presence of ammonia.

11. The process as defined by claim 10, wherein the molar ratio $(NH_3)/(Ti)$ does not exceed 1.5.

12. The process as defined by claim 1, said hydrolysis being carried out at a temperature of at least 70° C.

13. The process as defined by claim 1, further comprising a step of preparing an alkaline earth metal titanate by preparing a sol of the anatase, sulfur - free titanium dioxide recovered from said hydrolyzing step, admixing said sol with a solution of an alkaline earth metal nitrate, and drying and calcining the resulting admixture.

14. The process as defined by claim 13, further comprising grinding the calcined admixture.

15. The process as defined by claim 1, said at least one acid (i) or salt (ii) comprising a hydroxypolycarboxylic acid, (polyhydroxy)monocarboxylic acid, poly(hydroxycarboxylic) acid, dicarboxylic aminoacid, monocarboxylic aminoacid, or salt thereof.

16. The process as defined by claim 1, wherein the product consists of anatase, sulfur-free titanium dioxide.

17. The process as defined by claim 1, wherein the product is entirely anatase, sulfur-free titanium dioxide.

18. The process as defined by claim 1, wherein the product has a mean particle size of 45 nanometers or less.

19. A process for the preparation of anatase titanium dioxide, comprising a step of hydrolyzing a sulfur-free compound of titanium in the presence of
   (i) at least one organic carboxylic acid containing a combination of groups of either:
      (A) one carboxyl group in combination with
         (a) at least one hydroxyl group and at least one amine group, or
         (b) at least two amine groups, or
         (c) at least two hydroxyl groups,
      or (B) at least two carboxyl groups in combination with
         a) at least one hydroxyl group and at least one amine group, or
         b) at least one hydroxyl group, or c) at least one amine group, or (ii) at least one salt of said at least one acid (i), said hydrolysis being carried out in a reaction medium with a molar concentration of titanium ranging from 0.1 to 1.5 mole/liter in the reaction medium and a concentration of said at least one acid (i) or salt (ii) ranging from 0.002 to 0.5 mole/liter in the reaction medium and a step of recovering a product consisting essentially of anatase, sulfur-free titanium dioxide directly from said hydrolyzing step, the product having a mean particle size of 80 nanometers or less and being capable of forming a stable sol.

20. The process as defined in claim 1, wherein the molar concentration of titanium ranges from 0.5 to 1 mole/liter and the concentration of the acid or salt ranges from 0.02 to 0.2 mole/liter.

* * * * *